United States Patent
Lorberg

(10) Patent No.: US 10,140,613 B2
(45) Date of Patent: Nov. 27, 2018

(54) SYSTEMS AND METHODS FOR CONVERTING ACCOUNT PORTFOLIOS FROM ONE PROCESSING NETWORK TO ANOTHER

(71) Applicant: MasterCard International Incorporated, Purchase, NY (US)

(72) Inventor: Dana J. Lorberg, Creve Coeur, MO (US)

(73) Assignee: MASTERCARD INTERNATIONAL INCORPORATED, Purchase, NY (US)

( * ) Notice: Subject to any disclaimer, the term of this patent is extended or adjusted under 35 U.S.C. 154(b) by 480 days.

(21) Appl. No.: 14/882,246

(22) Filed: Oct. 13, 2015

(65) Prior Publication Data

US 2016/0104156 A1     Apr. 14, 2016

Related U.S. Application Data

(60) Provisional application No. 62/063,842, filed on Oct. 14, 2014.

(51) Int. Cl.
  *G06Q 40/00*   (2012.01)
  *G06Q 20/40*   (2012.01)
  *G06Q 20/12*   (2012.01)
  *G06Q 20/20*   (2012.01)

(52) U.S. Cl.
  CPC ......... *G06Q 20/401* (2013.01); *G06Q 20/123* (2013.01); *G06Q 20/20* (2013.01)

(58) Field of Classification Search
  CPC .................................................. G06Q 20/401
  USPC ............................................................. 705/44
  See application file for complete search history.

(56) References Cited

U.S. PATENT DOCUMENTS

| | | | |
|---|---|---|---|
| 6,805,287 B2 | 10/2004 | Bishop et al. | |
| 7,806,323 B2 | 10/2010 | Fomitchev | |
| RE43,157 E | 2/2012 | Bishop et al. | |
| 2006/0020542 A1 | 1/2006 | Litle et al. | |
| 2012/0284187 A1* | 11/2012 | Hammad | G06Q 20/20 705/44 |
| 2013/0110719 A1* | 5/2013 | Carter | G06Q 20/204 705/44 |

* cited by examiner

*Primary Examiner* — Samica L Norman
(74) *Attorney, Agent, or Firm* — Armstrong Teasdale LLP

(57) ABSTRACT

Methods and systems for translating account data from a converted account portfolio during a transaction initiated by a cardholder using a payment card are provided. The method may be implemented using a translation service computing device. The method includes storing first account data in a memory along with a corresponding translation identifier, the first account data associated with a first payment processing network (PPN), and receiving, at the TS computing device, an authorization request message. The authorization request message includes transaction data associated with the transaction and second account data, including the translation identifier, associated with the payment card and a second PPN. The method includes translating the second account data to the first account data by performing a lookup using the translation identifier, generating a translated authorization request message including the transaction data and the first account data, and transmitting the translated authorization request message to an issuer bank.

20 Claims, 9 Drawing Sheets

SYSTEMS AND METHODS FOR CONVERTING ACCOUNT PORTFOLIOS FROM ONE PROCESSING NETWORK TO ANOTHER

CROSS-REFERENCE TO RELATED APPLICATIONS

This application claims priority to U.S. Provisional Patent Application No. 62/063,842, filed Oct. 14, 2014, entitled "SYSTEMS AND METHODS FOR CONVERTING ACCOUNT PORTFOLIOS FROM ONE PROCESSING NETWORK TO ANOTHER," the entire contents of which are hereby incorporated by reference in their entirety.

BACKGROUND OF THE DISCLOSURE

The field of the present disclosure relates generally to the use of payment cards by cardholders in the payments industry, and, more particularly, to an account portfolio conversion system for translating first account data associated with a first payment processing network to second account data associated with a second payment processing network.

In the payment card or payment account industry, issuer banks issue payment cards to cardholders, and contract with a payment processing network to process transactions between a cardholder, a merchant and the issuer bank. In many cases, when the issuer bank contracts with the processing network, the issuer bank must invest time and money in its backend computer infrastructure so as to be able to communicate with the processing network.

In some cases, the issuer bank may decide to change from one processing network to another processing network. To do so, the issuer bank would typically have to convert its accounts from the original processing network to the new processing network. In addition, the issuer bank may have to make another large investment in technology and/or infrastructure to support the account portfolio conversion.

There exists a need for a system that enables issuer banks and other financial entities to convert their account portfolios from one processing network to another processing network without having to make such infrastructure changes and investments.

BRIEF DESCRIPTION OF THE DISCLOSURE

In one aspect, a computer-implemented method for translating account data during a transaction initiated by a cardholder using a payment card is provided. The method is implemented using a translation service (TS) computing device in communication with a processor and a memory. The method includes storing first account data in the memory along with a corresponding translation identifier, the first account data associated with a first payment processing network (PPN), and receiving, at the TS computing device, an authorization request message. The authorization request message includes transaction data associated with the transaction and second account data associated with the payment card and a second PPN, the second account data including the translation identifier. The method further includes translating the second account data to the first account data by performing a lookup within the memory using the translation identifier, generating a translated authorization request message including the transaction data and the first account data, and transmitting the translated authorization request message to an issuer bank.

In another aspect, a translation service (TS) computing device is provided. The TS computing device includes a processor in communication with a memory. The processor is programmed to store first account data in the memory along with a corresponding translation identifier, the first account data associated with a first payment processing network (PPN). The processor is also programmed to receive an authorization request message during a transaction initiated by a cardholder using a payment card, the authorization request message including transaction data associated with the transaction and second account data associated with the payment card and a second PPN, the second account data including the translation identifier. The processor is further programmed to translate the second account data to the first account data by performing a lookup within the memory using the translation identifier, generate a translated authorization request message including the transaction data and the first account data, and transmit the translated authorization request message to an issuer bank.

In yet another aspect, at least one non-transitory computer-readable media having computer-executable instructions embodied thereon is provided. When executed by at least one processor, the computer-executable instructions cause the processor to store first account data in a memory along with a corresponding translation identifier, the first account data associated with a first payment processing network (PPN). The computer-executable instructions also cause the processor to receive an authorization request message during a transaction initiated by a cardholder using a payment card, the authorization request message including transaction data associated with the transaction and second account data associated with the payment card and a second PPN, the second account data including the translation identifier. The computer-executable instructions further cause the processor to translate the second account data to the first account data by performing a lookup within the memory using the translation identifier, generate a translated authorization request message including the transaction data and the first account data, and transmit the translated authorization request message to an issuer bank.

BRIEF DESCRIPTION OF THE DRAWINGS

FIG. 1 is a schematic diagram illustrating an example multi-party transaction card industry system for enabling payment card transactions in accordance with the present disclosure.

FIG. 2 is a simplified block diagram of an example account portfolio conversion (APC) system for processing payment card transaction data and translating account data over the system shown in FIG. 1.

FIG. 3 is an expanded block diagram of an example embodiment of a server architecture of a payment processing network including a translating service computing device that may be used to perform various processing and translating services for a payment card transaction.

FIG. 4 illustrates an example configuration of a client device operated by a user such as the cardholder shown in FIG. 1.

FIG. 5 illustrates an example configuration of a server system such as the server system shown in FIGS. 2 and 3.

FIG. 6 is a data flow diagram from an example account portfolio conversion system and translating service computing device which translates account data for an issuer such as the issuer bank shown in FIG. 1.

FIG. 7 is a flow diagram of a method for converting an account portfolio of an issuer bank performed by the system shown in FIG. 2.

FIG. 8 is a flow diagram of a method for translating account data during a transaction performed by the system shown in FIG. 2.

FIG. 9 is a diagram of components of an example computing device that may be used in the APC system shown in FIG. 2.

Like numbers in the Figures indicate the same or functionally similar components.

DETAILED DESCRIPTION OF THE DISCLOSURE

Figure 1:
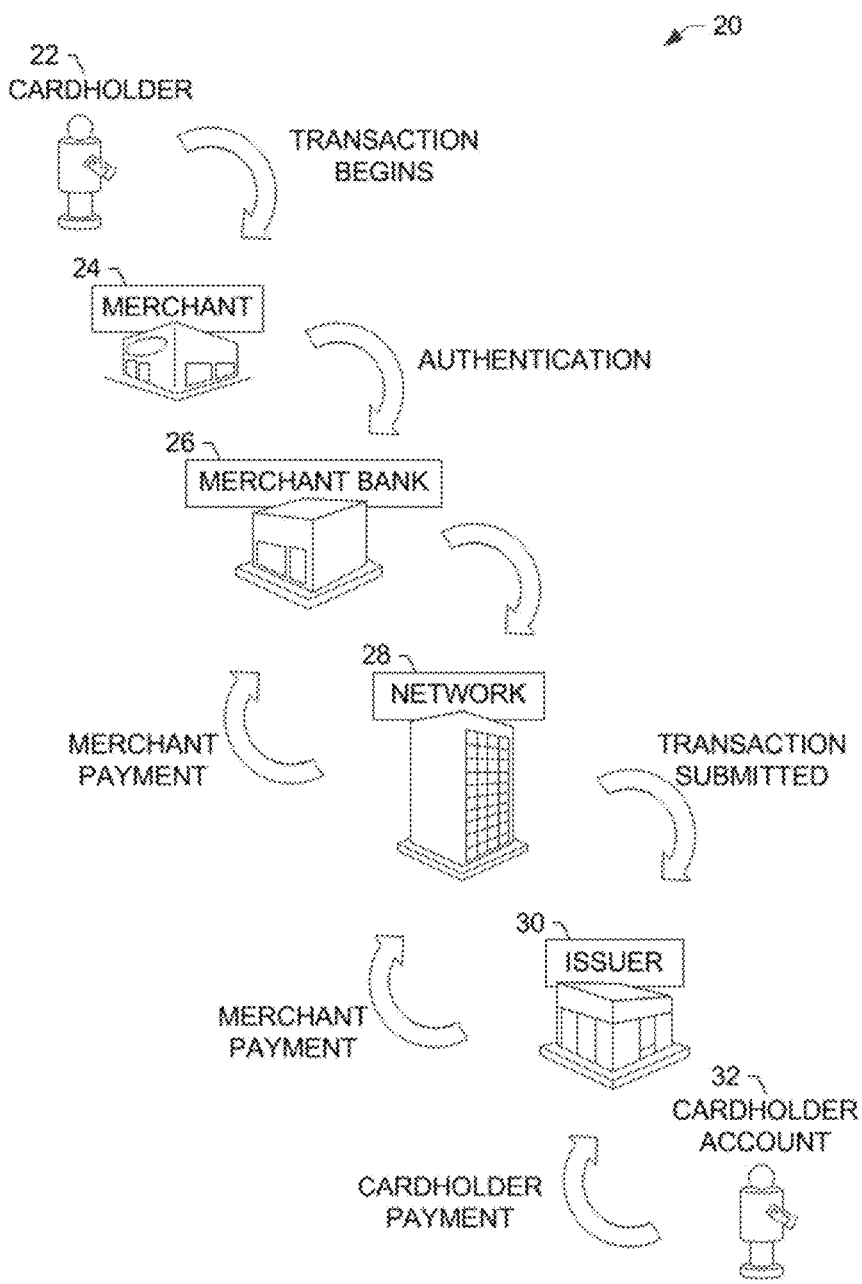
FIGS. 1-9 show example embodiments of the methods and systems described herein.

The systems and methods described herein are configured to convert an account portfolio of an issuer bank, and translate the account data for the account portfolio from account data associated with a first processing network to account data associated with a second processing network without the issuer bank making any significant infrastructure changes. In one aspect, systems and methods are configured to convert an account portfolio of a financial entity. In another aspect, systems and methods are configured to translate account data during a transaction.

At least some known payment card (e.g., credit/debit card) purchases involve the exchange of a number of network messages between merchant, acquirer, and issuer members of a multi-party interchange model. Such messages may include authorizations, advices, reversals, account status inquiry presentments, purchase returns, and chargebacks. The credit or debit card payment transaction messages may include several transaction attributes, such as, for example, bank identification numbers (BINs, typically the first four to six digits of a payment card number), primary account number (PANs, either real or virtual, typically the final nine to ten digits of a payment card number), payment card numbers, transaction amount, merchant identifier, acquirer identifier (the combination of which with above uniquely identifies a merchant), and transaction date-time. In general, at least some of these transaction attributes are specific to a payment processing network (PPN) that facilitates the transaction.

An issuer bank, which is responsible for issuing payment cards to cardholders and for authorizing transactions initiated with those payment cards, contracts with the PPN to communicate between the issuer bank and the merchant during the transaction process. In general, the issuer bank has an established infrastructure and authorization process in place. This established infrastructure is commonly tailored to the PPN with which the issuer bank has contracted. In at least some cases, the issuer bank may wish to switch from contracting with one PPN (a first PPN) to contracting with a second PPN. In general, the process to switch PPNs requires the issuer bank to convert their account portfolio (i.e., the account data for all of the cardholders having payment cards issued by the issuer bank) to a format compatible with the system of the second PPN. The switching process can take large investments of time, money, and effort to establish and manage a second infrastructure and second authorization process to communicate with the system of the second PPN.

The account portfolio conversion (APC) system described herein converts the account portfolio of the issuer bank to enable communication with a second PPN with little to no change in infrastructure by the issuer bank. The APC system further translates second (or initiating) account data associated with the second PPN to first (or translated) account data associated with a first PPN during a transaction. More specifically, the APC system receives the first account data associated with a plurality of cardholders and the issuer bank initiating the account portfolio conversion. The first account data includes first data elements associated with the first PPN. The APC system generates second account data that includes second data elements associated with the second PPN. In one embodiment, each of the second data elements corresponds to a corresponding first data element. The APC system maps the first account data to the second account data. The APC system further generates a translation identifier or "flag," which is stored in the memory. The translation identifier is associated with both the first and second account data. When the APC system receives the second account data during a transaction process, the APC system uses the translation identifier to identify that the second account data needs to be translated as well as identify the corresponding first account data associated with the received second account data (e.g., locate one of the sets of account data and/or locate a translation table), such that translation services may be implemented during the transaction.

The second PPN, the issuer bank, or a third party issues second payment cards to the plurality of cardholders, wherein the second payment cards are associated with and/or include the second account data. During a transaction initiated by a cardholder with a second payment card, the APC system translates the second account data associated with the second payment card to corresponding first account data. The APC system forwards the first account data to the issuer bank for use in an authorization process enacted by the issuer bank. The issuer bank requires little to no change in infrastructure or authorization process, because the issuer bank only encounters and uses first account data, which the issuer bank used in its authorization process when the issuer bank contracted with the first PPN.

At least one of the technical problems addressed by this system includes: (i) the requirement for an issuer bank to make a large financial investment in second and different processing technology and infrastructure in order to switch from a first PPN to a second PPN; (ii) the long timeline required for the issuer bank to switch from the first PPN to the second PPN; and (iii) the challenges of processing multiple different payment network transactions over a single payment network.

A technical effect of the systems and processes described herein is achieved by performing at least one of the following steps: (i) storing, by a translation service computing device, first account data in a memory along with a corresponding translation identifier, the first account data associated with a first payment processing network (PPN); (ii) receiving, at the TS computing device, an authorization request message associated with a transaction initiated by a cardholder using a payment card, the authorization request message including transaction data associated with the transaction and second account data associated with the payment card and a second PPN, the second account data including the translation identifier; (iii) translating the second account data to the first account data by performing a lookup within the memory using the translation identifier; (iv) generating a translated authorization request message including the transaction data and the first account data; and (v) transmitting the translated authorization request message to an issuer bank.

The technical effect achieved by this system is at least one of: (i) reducing or eliminating the financial investment of an issuer bank required to switch from an first PPN to a second PPN; (ii) providing an intermediate system for processing payments during the switch from the first PPN to the second PPN; and (iii) providing a system configured to process multiple different payment network transactions over a single payment network. For example, the account portfolio conversion (APC) system described herein may be either a final system implemented by the second PPN for the issuer bank or may be an intermediate system to accelerate the transition from the first PPN to the second PPN for the issuer bank, while the issuer bank transitions to second technology and infrastructure associated with the second PPN. Instead of requiring much, if any, front-end investment for the issuer bank, the APC system allows the issuer bank to begin using the second PPN in a much shorter timespan by providing the account portfolio conversion through the second PPN (rather than requiring the issuer bank itself to implement a second system). One or more of the parties to the transaction are benefited by the APC system by, for example, less burden on the issuer bank to contract with the second PPN, and a second or accelerated revenue opportunity for the second PPN (e.g., from the contract with the issuer bank).

As used herein, a processor may include any programmable system including systems using micro-controllers, reduced instruction set circuits (RISC), application specific integrated circuits (ASICs), logic circuits, and any other circuit or processor capable of executing the functions described herein. The above examples are example only, and are thus not intended to limit in any way the definition and/or meaning of the term "processor."

As used herein, the terms "software" and "firmware" are interchangeable, and include any computer program stored in memory for execution by a processor, including RAM memory, ROM memory, EPROM memory, EEPROM memory, and non-volatile RAM (NVRAM) memory. The above memory types are example only, and are thus not limiting as to the types of memory usable for storage of a computer program.

In one embodiment, a computer program is provided, and the program is embodied on a computer readable medium. In an example embodiment, the system is executed on a single computer system, without requiring a connection to a sever computer. In a further embodiment, the system is being run in a Windows® environment (Windows is a registered trademark of Microsoft Corporation, Redmond, Wash.). In yet another embodiment, the system is run on a mainframe environment and a UNIX® server environment (UNIX is a registered trademark of X/Open Company Limited located in Reading, Berkshire, United Kingdom). The application is flexible and designed to run in various different environments without compromising any major functionality. In some embodiments, the system includes multiple components distributed among a plurality of computing devices. One or more components may be in the form of computer-executable instructions embodied in a computer-readable medium. The systems and processes are not limited to the specific embodiments described herein. In addition, components of each system and each process can be practiced independent and separate from other components and processes described herein. Each component and process can also be used in combination with other assembly packages and processes.

As used herein, the terms "transaction card," "financial transaction card," and "payment card" refer to any suitable transaction card, such as a credit card, a debit card, a prepaid card, a charge card, a membership card, a promotional card, a frequent flyer card, an identification card, a prepaid card, a gift card, and/or any other device that may hold payment account information, such as mobile phones, Smartphones, personal digital assistants (PDAs), key fobs, digital wallets, and/or computers. Each type of transaction card can be used as a method of payment for performing a transaction. As used herein, the term "account" or "payment account" is used generally to refer to the underlying account with the payment card.

The following detailed description illustrates embodiments of the disclosure by way of example and not by way of limitation. It is contemplated that the disclosure has general application to processing financial transaction data by a third party in industrial, commercial, and residential applications.

As used herein, an element or step recited in the singular and proceeded with the word "a" or "an" should be understood as not excluding plural elements or steps, unless such exclusion is explicitly recited. Furthermore, references to "example embodiment" or "one embodiment" of the present disclosure are not intended to be interpreted as excluding the existence of additional embodiments that also incorporate the recited features.

FIG. 1 is a schematic diagram illustrating an example multi-party transaction card industry system 20 for authorizing payment card transactions and, more specifically, for converting an account portfolio of an issuer bank to enable a switch from an first payment processing network (PPN) to a second PPN. Embodiments described herein may relate to a financial transaction card system, such as a credit card payment system using the MasterCard® interchange network. The MasterCard® interchange network is a set of proprietary communications standards promulgated by MasterCard International Incorporated® for the exchange of financial transaction data and the settlement of funds between financial institutions that are members of MasterCard International Incorporated®. (MasterCard is a registered trademark of MasterCard International Incorporated located in Purchase, N.Y.).

In a typical transaction card system, a financial institution called the "issuer" issues a transaction card, such as a credit card, to a consumer or cardholder 22, who uses the transaction card to tender payment for a purchase from a merchant 24. To accept payment with the transaction card, merchant 24 must normally establish an account with a financial institution that is part of the financial payment system. This financial institution is usually called the "merchant bank," the "acquiring bank," or the "acquirer." When cardholder 22 tenders payment for a purchase with a transaction card, merchant 24 requests authorization from a merchant bank 26 for the amount of the purchase. The request may be performed over the telephone, but is usually performed through the use of a point-of-sale terminal, which reads cardholder's 22 account information from a magnetic stripe, a chip, or embossed characters on the transaction card and communicates electronically with the transaction processing computers of merchant bank 26. Alternatively, merchant bank 26 may authorize a third party to perform transaction processing on its behalf. In this case, the point-of-sale terminal will be configured to communicate with the third party. Such a third party is usually called a "merchant processor," an "acquiring processor," or a "third party processor."

Using an interchange network 28, computers of merchant bank 26 or merchant processor will communicate with computers of an issuer bank 30 to determine whether cardholder's 22 account 32 is in good standing and whether the purchase is covered by cardholder's 22 available credit line. Based on these determinations, the request for authorization will be declined or accepted. If the request is accepted, an authorization code is issued to merchant 24.

When a request for authorization is accepted, the available credit line of cardholder's 22 account 32 is decreased. Normally, a charge for a payment card transaction is not posted immediately to cardholder's 22 account 32 because bankcard associations, such as MasterCard International Incorporated®, have promulgated rules that do not allow merchant 24 to charge, or "capture," a transaction until goods are shipped or services are delivered. However, with respect to at least some debit card transactions, a charge may be posted at the time of the transaction. When merchant 24 ships or delivers the goods or services, merchant 24 captures the transaction by, for example, appropriate data entry procedures on the point-of-sale terminal. This may include bundling of approved transactions daily for standard retail purchases. If cardholder 22 cancels a transaction before it is captured, a "void" is generated. If cardholder 22 returns goods after the transaction has been captured, a "credit" is generated. Interchange network 28 and/or issuer bank 30 stores the transaction card information, such as a type of merchant, amount of purchase, date of purchase, in a database 120 (shown in FIG. 2).

After a purchase has been made, a clearing process occurs to transfer additional transaction data related to the purchase among the parties to the transaction, such as merchant bank 26, interchange network 28, and issuer bank 30. More specifically, during and/or after the clearing process, additional data, such as a time of purchase, a merchant name, a type of merchant, purchase information, cardholder account information, a type of transaction, information regarding the purchased item and/or service, and/or other suitable information, is associated with a transaction and transmitted between parties to the transaction as transaction data and/or account data, and may be stored by any of the parties to the transaction.

After a transaction is authorized and cleared, the transaction is settled among merchant 24, merchant bank 26, and issuer bank 30. Settlement refers to the transfer of financial data or funds among merchant's 24 account, merchant bank 26, and issuer bank 30 related to the transaction. Usually, transactions are captured and accumulated into a "batch," which is settled as a group. More specifically, a transaction is typically settled between issuer bank 30 and interchange network 28, and then between interchange network 28 and merchant bank 26, and then between merchant bank 26 and merchant 24.

Issuer bank 30 may contract with an interchange network (also referred to herein as "payment processing network (PPN)"). If issuer bank 30 wishes to contract with a second interchange network 28 (i.e., a second PPN 28), the switching process can be costly and burdensome, as described above. The account portfolio conversion (APC) system described hereinbelow enables second PPN 28 to convert first account data associated with a first PPN (not shown in FIG. 1) to second account data associated with second PPN 28. The term "account data" is used herein to refer generally to at least one of a cardholder name, a cardholder address, a bank identification number (BIN), a personal account number (PAN), a payment card number, a payment card expiration date, a payment card security code (e.g., a CVC code, CVV code, etc.), and other account identifier(s).

More specifically, the APC system generates the second account data and maps the first account data to the second account data. The APC system further generates a translation identifier and associates the translation identifier with one or more of the first account data, the second account data, and the translation or mapping. Second PPN 28, issuer 30, or a third party (not shown) issues a second payment card to cardholder 22 with the second account data. Cardholder 22 initiates a transaction with the second payment card. The APC system receives the second account data, associated with the second payment card, during processing of the transaction, as well as the translation identifier. Upon receipt of the translation identifier, which may identify the second account data as data to be translated and/or identify corresponding first account data, the APC system of second PPN 28 translates the second account data associated with the second payment card to the first account data. The APC system of second PPN 28 sends the first account data to issuer bank 30 for use in the authorization process of issuer bank 30. The authorization process of issuer bank 30 is little or no different from the authorization process of issuer bank 30 when issuer bank 30 contracted with the first PPN.

Figure 2:
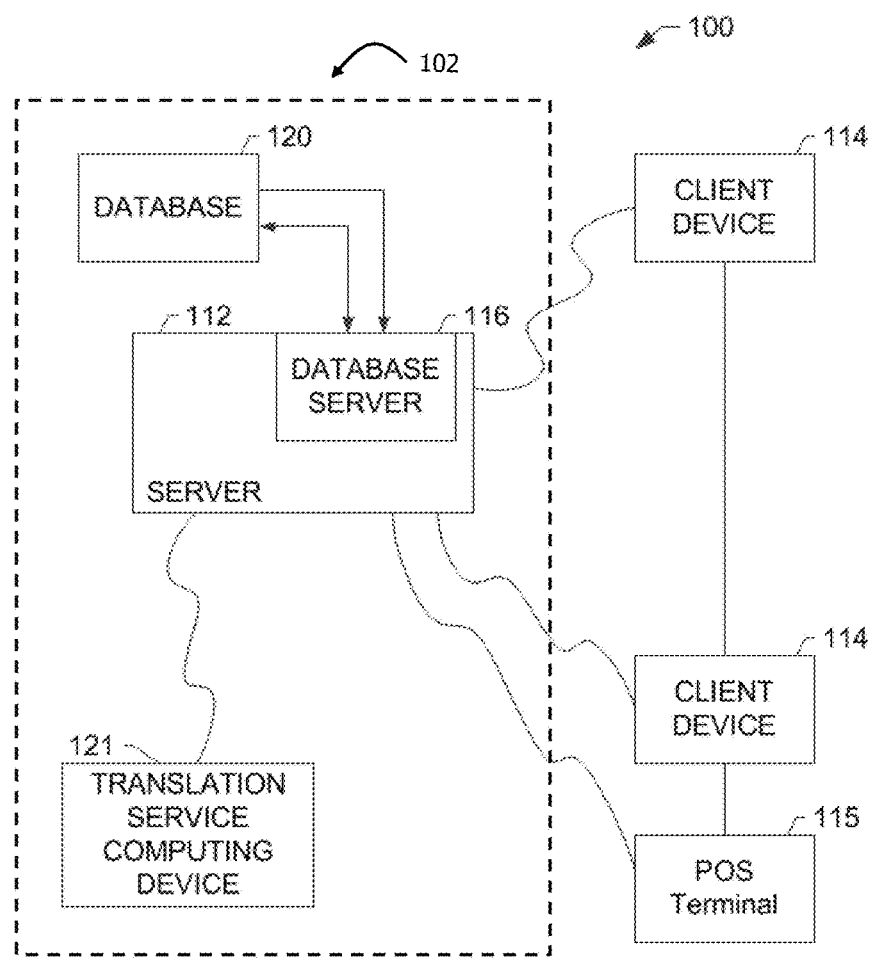

FIG. 2 is a simplified block diagram of an example payment network 100 that includes APC system 102. In some embodiments, payment network 100 is similar to payment system 20 (shown in FIG. 1). In the example embodiment, network 100 includes a plurality of computer devices connected in communication in accordance with the present disclosure. Network 100 includes a server system 112 in communication with a point-of-sale (POS) terminal 115 at a merchant location 24 (shown in FIG. 1), and/or other client devices 114 associated with cardholders, merchants, merchant banks, payment networks, and/or issuer banks.

More specifically, in the example embodiment, APC system 102 includes a server system 112 of, for example, a second payment processing network 28, in communication with a point-of-sale (POS) terminal 115 at a merchant location 24, and/or other client devices 114 associated with cardholders, merchants, merchant banks, payment networks, and/or issuer banks Server system 112 is also in communication with a plurality of client sub-systems, also referred to as client devices 114. In one embodiment, client devices 114 are computers including a web browser, such that server system 112 is accessible to client devices 114 using the Internet. Client devices 114 are interconnected to the Internet through many interfaces including a network, such as a local area network (LAN) or a wide area network (WAN), dial-in-connections, cable modems, special high-speed Integrated Services Digital Network (ISDN) lines, and RDT networks. Client devices 114 could be any device capable of interconnecting to the Internet including a web-based phone, PDA, or other web-based connectable equipment.

In the example embodiment, payment network 100 also includes POS terminals 115, which may be connected to client devices 114 and may be connected to server system 112. POS terminals 115 may be interconnected to the Internet (or any other network that allows the POS terminals 115 to communicate as described herein) through many interfaces including a network, such as a local area network (LAN) or a wide area network (WAN), dial-in-connections, cable modems, wireless modems, and special high-speed ISDN lines. POS terminals 115 could be any device capable of interconnecting to the Internet and including an input device capable of reading information from a cardholder's financial transaction card. In some embodiments, POS terminal 115 may be a cardholder's personal computer, such as when conducting an online purchase through the Internet. As used herein, the terms POS device, POS terminal, and point of interaction device are used broadly, generally, and interchangeably to refer to any device in which a cardholder interacts with a merchant to complete a payment card transaction.

A database server 116 is connected to database 120, which contains information on a variety of matters, as described below in greater detail. In one embodiment, centralized database 120 is stored on server system 112 and can be accessed by potential users at one of client devices 114 by logging onto server system 112 through one of client devices 114. In an alternative embodiment, database 120 is stored remotely from server system 112 and may be non-centralized.

Database 120 may include a single database having separated sections or partitions or may include multiple databases, each being separate from each other. Database 120 may store transaction data generated as part of sales activities and savings activities conducted over the processing network including data relating to merchants, account holders or customers, issuers, acquirers, savings amounts, savings account information, and/or purchases made. Database 120 may also store merchant data including a merchant identifier that identifies each merchant registered to use the network, and instructions for settling transactions including merchant bank account information. Database 120 may also store purchase data associated with items being purchased by a cardholder from a merchant, and authorization request data. In some embodiments, database 120 may also store account data, including first account data associated with a first PPN and/or second account data associated with a second PPN, as well as a translation identifier associated with first account data, corresponding second account data, and the translation between the two (e.g., a translation table or mapping algorithm facilitating translation between first and second account data). In these embodiments, translation service (TS) computing device (as described below in further detail) 121 is in communication with database 120.

In the example embodiment, one of client devices 114 may be associated with acquirer bank 26 (shown in FIG. 1) while another one of client devices 114 may be associated with issuer bank 30 (shown in FIG. 1). POS terminal 115 may be associated with a participating merchant 24 (shown in FIG. 1) or may be a computer system and/or mobile system used by a cardholder 22 (shown in FIG. 1) making an on-line purchase or payment. Server system 112 may be associated with second payment processing network 28. In the example embodiment, server system 112 is associated with second PPN 28, and may be referred to as an interchange computer system or a payment processing computing device. Server system 112 may be used for processing transaction data. In addition, client devices 114 and/or POS terminal 115 may include a computer system associated with at least one of an online bank, a bill payment outsourcer, an acquirer bank, an acquirer processor, an issuer bank associated with a transaction card, an issuer processor, a remote payment system, and/or a biller.

In the example embodiment, a translation service (TS) computing device 121, which is part of APC system 102, converts an account portfolio of issuer bank 30 from a first PPN to second PPN 28. TS computing device 121 is configured to generate second account data corresponding to or translatable to first account data provided by issuer bank 30 by communicating with server system 112 and/or with database 120. TS computing device 121 is further configured to generate a translation identifier that is included with second account data. The translation identifier is configured to facilitate identification of second account data to be translated and/or translation of the second account data into first account data. During a transaction with merchant 24, TS computing device 121 receives the second account data associated with a second payment card, as well as the translation identifier. TS computing device 121 may use the translation identifier to identify the second account data as associated with the converted account portfolio of issuer bank 30. TS computing device 121 translates the second account data to corresponding first account data by performing a lookup within database 120 (and/or another memory device) using the translation identifier, which enables TS computing device 121 to translate the second account data into the first account data. TS computing device 121 sends the first account data to issuer bank 30 for use in an authorization process of issuer bank 30. TS computing device 121 receives an authorization response message from issuer bank 30 and translates the first account data to the corresponding second account data, which is then forwarded with a translated authorization response message to the merchant 24. In some embodiments, TS computing device 121 is also in communication with a merchant system (e.g., client device 114) and/or POS terminal 115 of the merchant.

Figure 3:
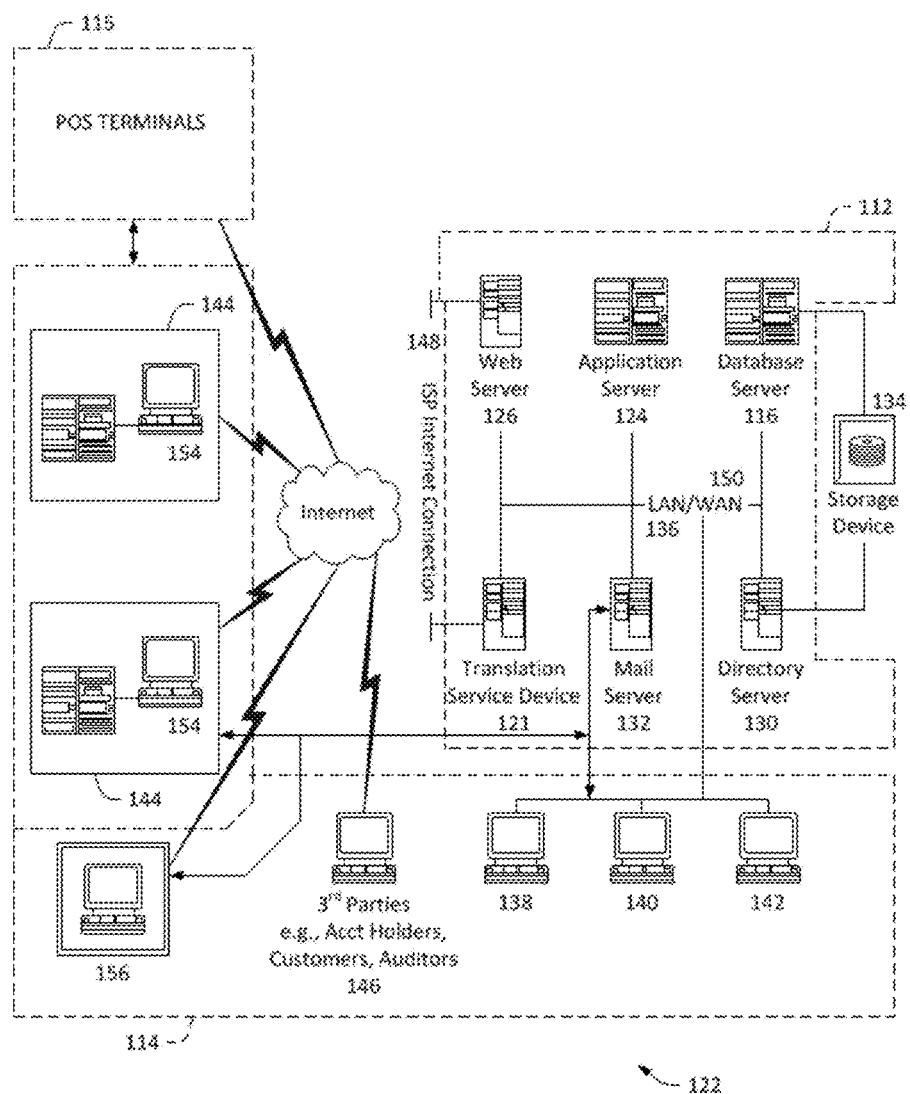

FIG. 3 is an expanded block diagram of an example embodiment of a server architecture of a transaction processing network 122 including a TS computing device 121 that may be used to generate second account data corresponding to first account data received from issuer bank 30 (shown in FIG. 1). TS computing device 121 may also be used to translate one of second account data and first account data to the other of second account data and first account data. Components in network 122, identical to components of network 100 (shown in FIG. 2), are identified in FIG. 3 using the same reference numerals as used in FIG. 2. Transaction processing network 122 includes server system 112, client devices 114, and POS terminals 115. Server system 112 further includes database server 116, a transaction server 124, a web server 126, a directory server 130, and a mail server 132. A storage device 134 is coupled to database server 116 and directory server 130. Servers 116, 124, 126, 130, and 132 are coupled in a local area network (LAN) 136. In addition, an issuer bank workstation 138, an acquirer bank workstation 140, and a third party processor workstation 142 may be coupled to LAN 136 using an Internet link or are connected through an Intranet.

Each workstation 138, 140, and 142 is a personal computer having a web browser. Although the functions performed at the workstations typically are illustrated as being performed at respective workstations 138, 140, and 142, such functions can be performed at one of many personal computers coupled to LAN 136. Workstations 138, 140, and 142 are illustrated as being associated with separate functions only to facilitate an understanding of the different types of functions that can be performed by individuals having access to LAN 136.

Server system 112 is configured to be communicatively coupled to various individuals, including employees 144 and to third parties, e.g., account holders, customers, auditors, developers, cardholders (i.e., consumers), merchants, acquirers, issuers, etc., 146 using an ISP Internet connection 148. The communication in the example embodiment is illustrated as being performed using the Internet, however, any other wide area network (WAN) type communication can be utilized in other embodiments, i.e., the systems and processes are not limited to being practiced using the Internet. In addition, and rather than WAN 150, local area network 136 could be used in place of WAN 150.

In the example embodiment, any authorized individual having a workstation 154 can access network 122. At least one of the client systems includes a manager workstation 156 located at a remote location. Workstations 154 and 156 are personal computers having a web browser. Also, workstations 154 and 156 are configured to communicate with server system 112.

Figure 4:
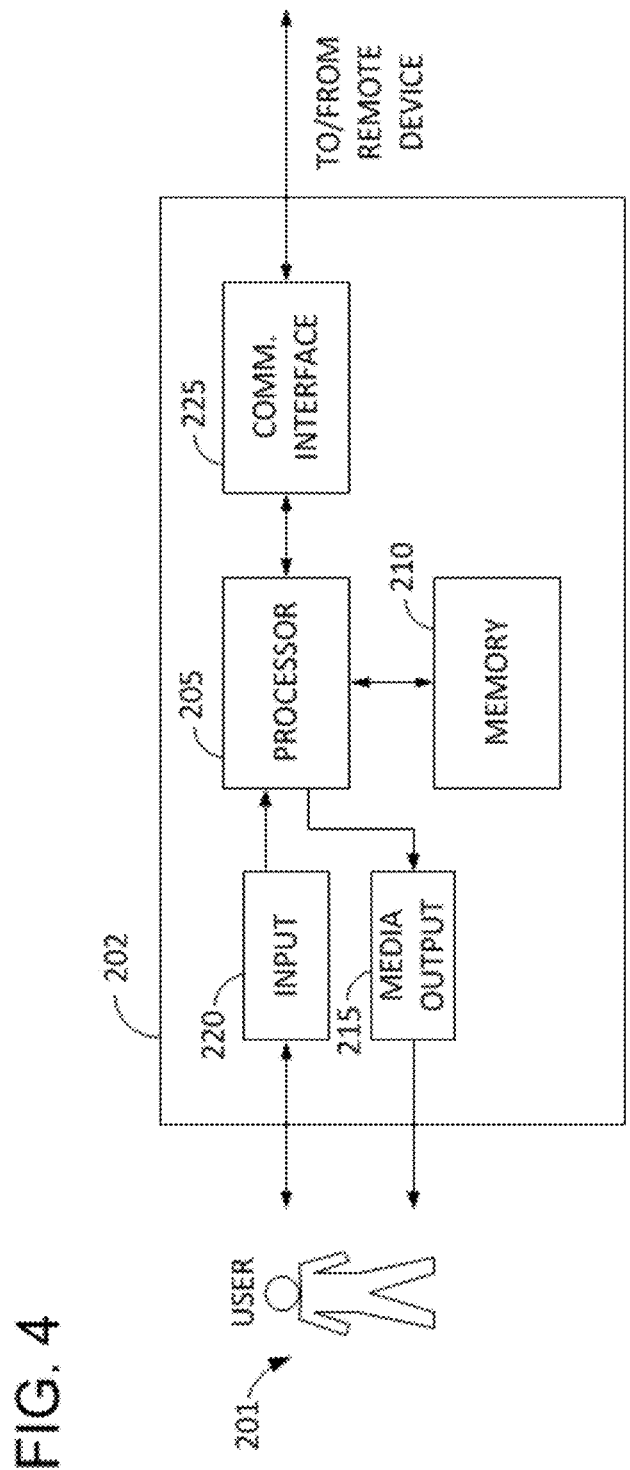

FIG. 4 illustrates an example configuration of a user system 202 operated by a user 201, such as cardholder 22 (shown in FIG. 1). In some embodiments, user system 202 is a merchant system and/or a merchant POS device. In some embodiments, user system 202 is a client device 114 (shown in FIGS. 2 and 3). In the example embodiment, user system 202 includes a processor 205 for executing instructions. In some embodiments, executable instructions are stored in a memory area 210. Processor 205 may include one or more processing units, for example, a multi-core configuration. Memory area 210 is any device allowing information such as executable instructions and/or written works to be stored and retrieved. Memory area 210 may include one or more computer readable media.

User system 202 also includes at least one media output component 215 for presenting information to user 201. Media output component 215 is any component capable of conveying information to user 201. In some embodiments, media output component 215 includes an output adapter such as a video adapter and/or an audio adapter. An output adapter is operatively coupled to processor 205 and operatively couplable to an output device such as a display device, a liquid crystal display (LCD), organic light emitting diode (OLED) display, or "electronic ink" display, or an audio output device, a speaker or headphones.

In some embodiments, user system 202 includes an input device 220 for receiving input from user 201. Input device 220 may include, for example, a keyboard, a pointing device, a mouse, a stylus, a touch sensitive panel, a touch pad, a touch screen, a gyroscope, an accelerometer, a position detector, or an audio input device. A single component such as a touch screen may function as both an output device of media output component 215 and input device 220. User system 202 may also include a communication interface 225, which is communicatively couplable to a remote device such as server system 112. Communication interface 225 may include, for example, a wired or wireless network adapter or a wireless data transceiver for use with a mobile phone network, Global System for Mobile communications (GSM), 3G, or other mobile data network or Worldwide Interoperability for Microwave Access (WIMAX).

Stored in memory area 210 are, for example, computer readable instructions for providing a user interface to user 201 via media output component 215 and, optionally, receiving and processing input from input device 220. A user interface may include, among other possibilities, a web browser and client application. Web browsers enable users, such as user 201, to display and interact with media and other information typically embedded on a web page or a website from server system 112. A client application allows user 201 to interact with a server application from server system 112.

In the example embodiment, computing device 202 is a user computing device from which user 201 engages with a merchant (e.g., merchant 24, shown in FIG. 1), a network (e.g., second PPN 28, shown in FIG. 1), and an issuer of a payment card (e.g., issuer 30, shown in FIG. 1) to perform a transaction which undergoes a translation process.

Figure 5:
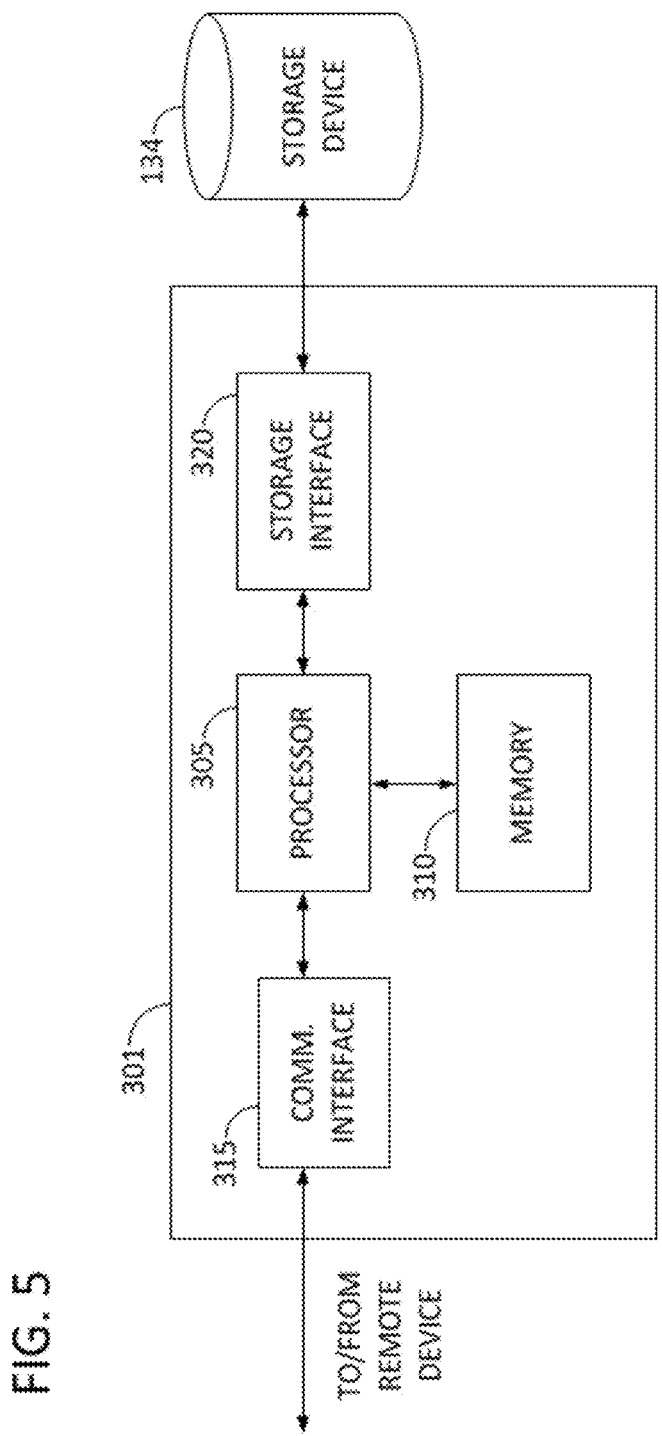

FIG. 5 illustrates an example configuration of a server system 301 such as server system 112 (shown in FIGS. 2 and 3). Server system 301 may include, but is not limited to, database server 116, transaction server 124, web server 126, directory server 130, mail server 132, and TS computing device 121.

Server system 301 includes a processor 305 for executing instructions. Instructions may be stored in a memory area 310, for example. Processor 305 may include one or more processing units (e.g., in a multi-core configuration) for executing instructions. The instructions may be executed within a variety of different operating systems on the server system 301, such as UNIX, LINUX, Microsoft Windows®, etc. It should also be appreciated that upon initiation of a computer-based method, various instructions may be executed during initialization. Some operations may be required in order to perform one or more processes described herein, while other operations may be more general and/or specific to a particular programming language (e.g., C, C#, C++, Java, or other suitable programming languages, etc.).

Processor 305 is operatively coupled to a communication interface 315 such that server system 301 is capable of communicating with a remote device such as user system 202 (shown in FIG. 4) or another server system 301. For example, communication interface 315 may receive requests from client device 114 via the Internet, as illustrated in FIGS. 2 and 3.

Processor 305 may also be operatively coupled to a storage device 134. Storage device 134 is any computer-operated hardware suitable for storing and/or retrieving data. In some embodiments, storage device 134 is integrated in server system 301. For example, server system 301 may include one or more hard disk drives as storage device 134. In other embodiments, storage device 134 is external to server system 301 and may be accessed by a plurality of server systems 301. For example, storage device 134 may include multiple storage units such as hard disks or solid state disks in a redundant array of inexpensive disks (RAID) configuration. Storage device 134 may include a storage area network (SAN) and/or a network attached storage (NAS) system.

In some embodiments, processor 305 is operatively coupled to storage device 134 via a storage interface 320. Storage interface 320 is any component capable of providing processor 305 with access to storage device 134. Storage interface 320 may include, for example, an Advanced Technology Attachment (ATA) adapter, a Serial ATA (SATA) adapter, a Small Computer System Interface (SCSI) adapter, a RAID controller, a SAN adapter, a network adapter, and/or any component providing processor 305 with access to storage device 134.

Memory area 310 may include, but are not limited to, random access memory (RAM) such as dynamic RAM (DRAM) or static RAM (SRAM), read-only memory (ROM), erasable programmable read-only memory (EPROM), electrically erasable programmable read-only memory (EEPROM), and non-volatile RAM (NVRAM). The above memory types are exemplary only, and are thus not limiting as to the types of memory usable for storage of a computer program.

In the example embodiment, server system 301 is included within APC system 102 (shown in FIG. 2) in communication with one or more of issuer 30 and merchant 24 during a payment card transaction involving a second payment card associated with a second PPN. APC system 102 translates second account data associated with the second payment card that is received in an authorization request message from merchant 24 (shown in FIG. 1) to corresponding first account data during the transaction using a translation identifier that is stored in memory area 310 along with stored first account data and/or one or more translation tools (e.g., a lookup or translation table associating first account data with second account data). APC system 102 sends a translated authorization request message to issuer bank 30 (shown in FIG. 1) that includes the first account data. APC system 102 receives an authorization response message that includes the first account data and translates the first account data to the corresponding second account data. APC system 102 sends a translated authorization response message to the merchant 24 that includes the second account data.

Figure 6:
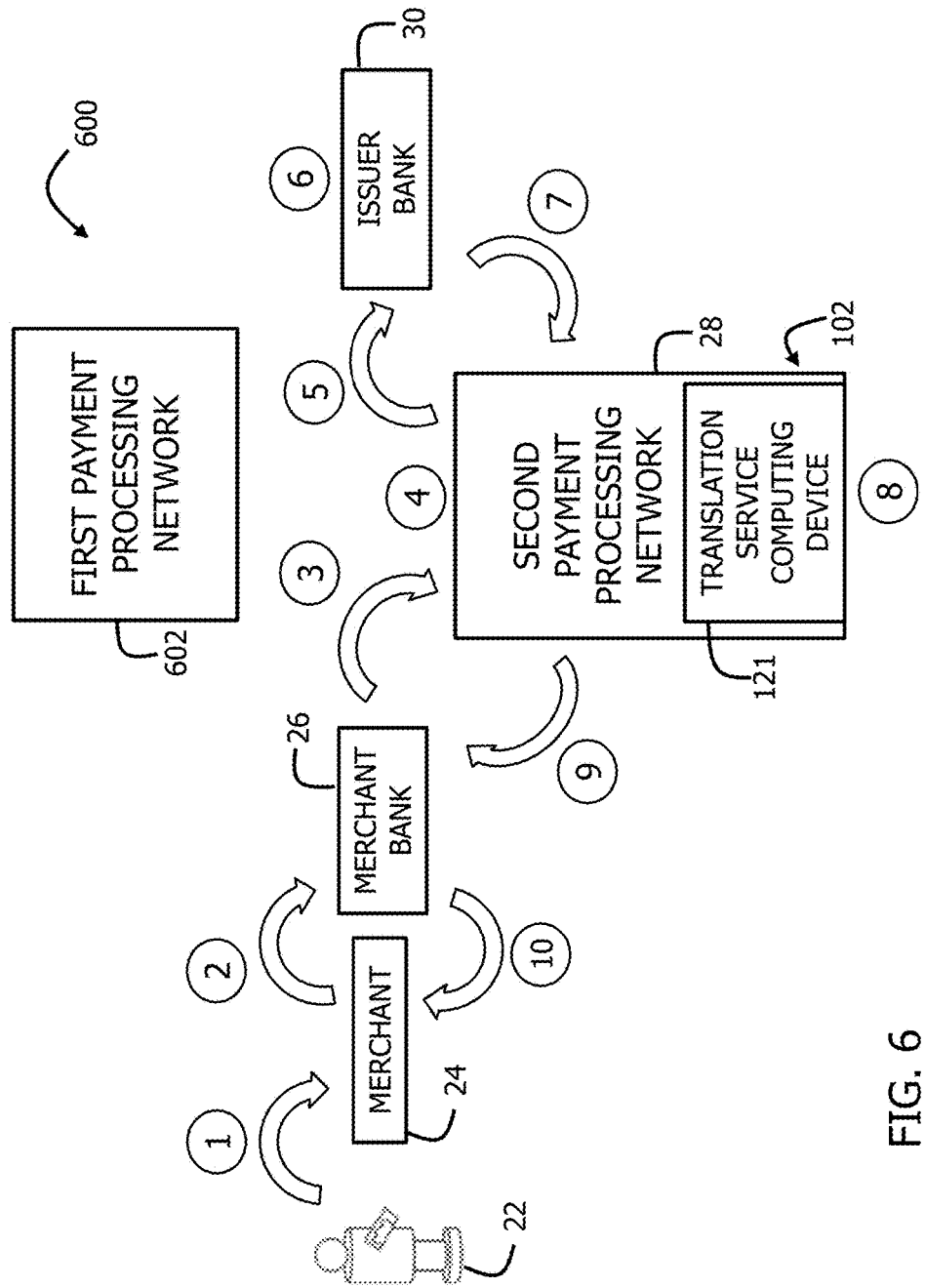

FIG. 6 is a data flow diagram 600 of an example account portfolio conversion (APC) system 102 which uses translation service (TS) computing device 121 to convert an account portfolio of issuer bank 30 (shown in FIG. 1) with little to no change in infrastructure by the issuer bank 30. APC system 102 also uses TS computing device 121 to translate account data associated with the converted account portfolio during a transaction with little to no change in infrastructure and authorization process by issuer bank 30. In the example embodiment, issuer bank 30 has transitioned or switched from using (i.e., contracting with) first payment processing network (PPN) 602 for processing payment card transactions to using second PPN 28 (shown in FIG. 1) for processing payment card transactions. TS computing device 121 associated with second PPN 28 receives first account data for a plurality of cardholders (e.g., cardholder 22, shown in FIG. 1) having accounts with issuer bank 30. First account data includes first data elements associated with first PPN 602. For example, first data elements may include at least one of a first BIN, a first PAN, a first payment card number, a first payment card expiration date, and a first security code.

TS computing device 121 generates second account data associated with second PPN 28 for each of the plurality of cardholders. Second account data includes second data elements associated with second PPN 28. Each of the second data elements corresponds to a first data element. For example, second data elements may include at least one of a second BIN, a second PAN, a second payment card number, a second payment card expiration date, and a second security code. In other words, data elements of the first account data that are associated with cardholder 22 and/or issuer bank 30 are unchanged in the second account data, whereas first data elements of the first account data associated with first PPN 602 are replaced with second data elements of the second account data associated with second PPN 28. Second PPN 28, issuer bank 30, or a third party (not shown) issues second payment cards associated with the second account data to the plurality of cardholders.

TS computing device 121 further maps each of the first data elements of the first account data to corresponding second data elements of the second account data for each of the plurality of cardholders. TS computing device 121 may generate a translation table during or after the mapping of first account data to second account data. Table 1 illustrates one example translation table.

TABLE 1

Example Translation Table

| First Account Data Element (Description) | First Account Data Element (Value) | Second Account Data Element (Description) | Second Account Data Element (Value) |
|---|---|---|---|
| Payment Card Number | 0123456789012345 | Payment Card Number | 9876543210987654 |
| BIN | 012345 | BIN | 987654 |
| PAN | 6789012345 | PAN | 3210987654 |
| Security Code | 000 | Security Code | 111 |
| Expiration Date | January 2016 | Expiration Date | January 2017 |
| Name | Jane Q. Public | Name | Jane Q. Public |
| Issuer | Bank A | Issuer | Bank A |
| Processor | First PPN | Processor | Second PPN |

The translation table may be stored within a memory at TS computing device 121 or within memory 120. In some embodiments, based on the translation table, TS computing device 121 may compile and store a "packet" of first account data associated with one or more of the second account data elements, the packet including all first account data elements mapped to corresponding second account data elements. In some embodiments, the second account data element(s) may include or be associated with a flag or translation identifier for such association, such that upon receipt of the second account data element(s) in a transaction, TS computing device 121 uses the translation identifier to identify the second account data for translation and perform a lookup within memory 120. The translation identifier may further enable TS computing device 121 to commence retrieval the entire packet of first account data elements, which correspond with the second account data elements received with the transaction data, in a single processing step. The translation identifier may be a second account data element (e.g., the second PAN or the second BIN), one or more digits of a second account data element, and/or a separate data element appended to or otherwise associated with second account data. Upon receipt of the translation identifier, TS computing device 121 may automatically initiate translation. Additionally or alternatively, the translation identifier may be associated with the translation or mapping from first to second account data elements, such that detection of the translation identifier with the second account data instructs TS computing device 121 where to locate corresponding first account data (discrete elements and/or packets), to commence translation from second account data to first account data.

During a transaction, TS computing device 121 receives the second account data elements from a merchant POS device at which the transaction is initiated, from an acquirer processor associated with the merchant POS, and/or from a transaction processor. TS computing device 121 may receive the second account data elements, for example, in a data string or other electronic data transmission format. TS computing device 121 may be configured to identify the second account data as associated with the converted account portfolio of the issuer bank 30. For example, TS computing device 121 may associate a flag or translation identifier with one or more of the second data elements and/or first data elements, such that, when TS computing device 121 receives and detects the translation identifier, TS computing device 121 automatically initiates the translation service. Additionally, in some embodiments, the translation identifier further identifies a location of first account data corresponding to the second account data (and/or second account data corresponding to the first account data), such that TS computing device 121 may commence translation. TS computing device 121 may then translate second account data to first account data for communicating with issuer bank 30, and may further translate first account data to second account data for communicating with merchant bank 26.

In one embodiment, TS computing device 121 translates the received second account data elements in an element-by-element process before transmitting translated first account data elements to issuer bank 30. For example, TS computing device 121 may implement one or more processing algorithms to translate each second account data element to its corresponding first account data element stored in the translation table. In such an embodiment, TS computing device 121 may electronically generate a translated message (for example, a translated authorization request message) by replacing each data element in the original, untranslated authorization message (corresponding to the received second account data) with a translated data element (corresponding to the stored and retrieved first account data), thereby generating a translated data string.

In some embodiments, TS computing device 121 translates the received second account data in a "packet" fashion. In other words, upon receiving the second account data elements, which are identified for translation, TS computing device 121 automatically retrieves and transmits the pre-compiled packet of associated first account data, without requiring real-time translation of individual data elements. It should be understood that the reverse of the above-described processes may be implemented to translate first account data elements, received from issuer bank 30, to second account data elements, for transmission back to the merchant POS, acquirer bank 26, and/or the transaction processor, for completion of the transaction.

In the example embodiment, at Step 1, cardholder 22 uses a second payment card associated with second account data to initiate a transaction (e.g., make a purchase). At Step 2, merchant 24 sends an authorization request message that contains transaction data and the second account data. At Step 3, merchant bank 26 forwards the first authorization request message to second PPN 28. At Step 4, TS computing device 121 of APC system 102, associated with second PPN 28, receives the authorization request message including the second account data. TS computing device 121 identifies the second account data as associated with the converted account portfolio of issuer bank 30. TS computing device 121 translates the second account data to corresponding first account data associated with cardholder 22. TS computing device 121 further generates a translated authorization request message, which includes the transaction data and the first account data. At Step 5, TS computing device 121 sends the translated authorization message to issuer bank 30. At Step 6, issuer bank 30 receives the translated authorization message and uses the first account data to determine whether or not to authorize the transaction, as described above in FIG. 1. The authorization process enacted by issuer bank 30 is little or no different from an authorization process enacted by issuer bank 30 when issuer bank 30 contracted with first PPN 602. At Step 7, issuer bank 30 sends an authorization response message that includes the transaction data and the first account data to second PPN 28. At Step 8, TS computing device 121 receives the authorization response message including the first account data. TS computing device 121 translates the first account data to the corresponding second account data. TS computing device 121 further generates a translated authorization response message, which includes the transaction data and the second account data. At Step 9, TS computing device 121 sends the translated authorization response message to merchant bank 26. At Step 10, merchant bank 26 receives the translated authorization response message and, if the transaction is authorized, authorizes merchant 24 to complete the transaction.

Additionally, in some embodiments, TS computing device 121 provides additional services to one or more of issuer bank 30, merchant bank 26, and/or cardholder 22. For example, TS computing device 121 may provide stored translation tables and/or packets of data elements to issuer bank 30, such that if cardholder 22 has a customer service concern, issuer bank 30 has access to the second account data elements that are visible to cardholder 22 (e.g., cardholder 22's new card number is a second account data element). Translation tables and/or packets may further be provided for clearing and/or billing purposes. In one embodiment, TS computing device 121 provides the translation tables and/or packets to issuer bank 30 for issuer bank 30 during their bill-issuance process, such that issuer bank 30 issues bills with second account data elements to cardholder 22. In another embodiment, TS computing device 121 (or another element of APC system 102) is configured to provide bill-preparation and/or bill-issuance services to issuer bank 30. For example, issuer bank 30 may transmit billing information (e.g., billing totals) associated with first account data to TS computing device 121. TS computing device 121 may then translate the first account data to second account data, update the billing information, and (a) issue bills including second account data to cardholders 22; and/or (b) communicate the updated billing information back to issuer bank 30 for the issuance of bills including second account data.

Figure 7:
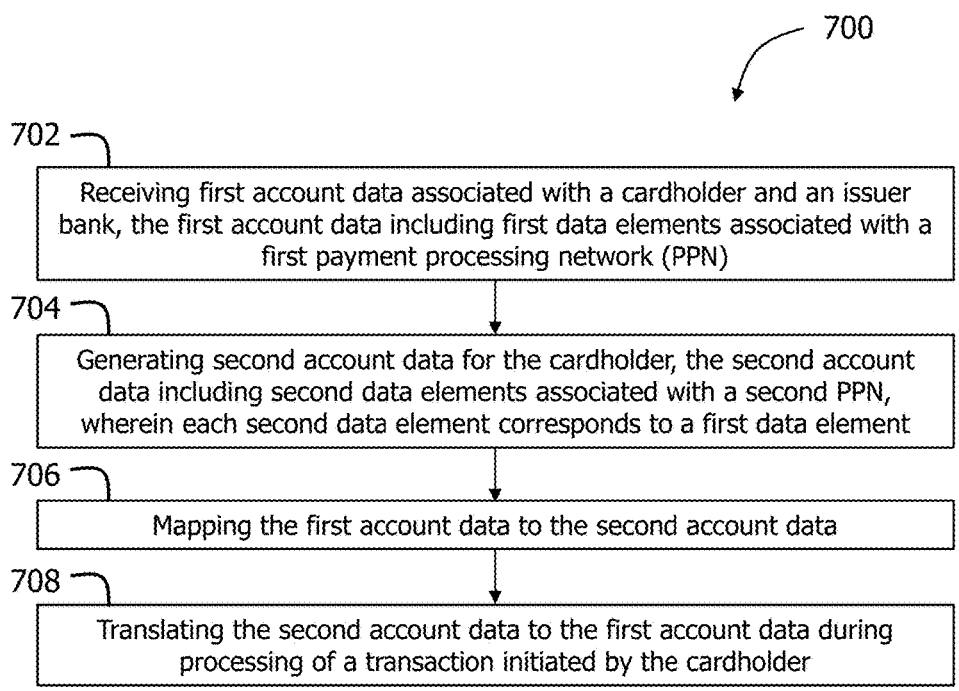

FIG. 7 is a flow diagram of a method 700 for converting an account portfolio of an issuer bank (e.g., issuer bank 30, shown in FIG. 1). Method 700 is implemented using a translation service (TS) computing device (e.g., TS computing device 121, shown in FIG. 2) in communication with a processor and a memory. Method 700 includes receiving 702 first account data associated with a cardholder and the issuer bank, the first account data including first data elements associated with a first payment processing network (PPN). Method 700 further includes generating 704 second account data for the cardholder, the second account data including second data elements associated with a second PPN, wherein each second data element corresponds to a first data element. Method 700 also includes mapping 706 the first account data to the second account data, and translating 708 the second account data to the first account data during processing of a transaction initiated by the cardholder.

Figure 8:
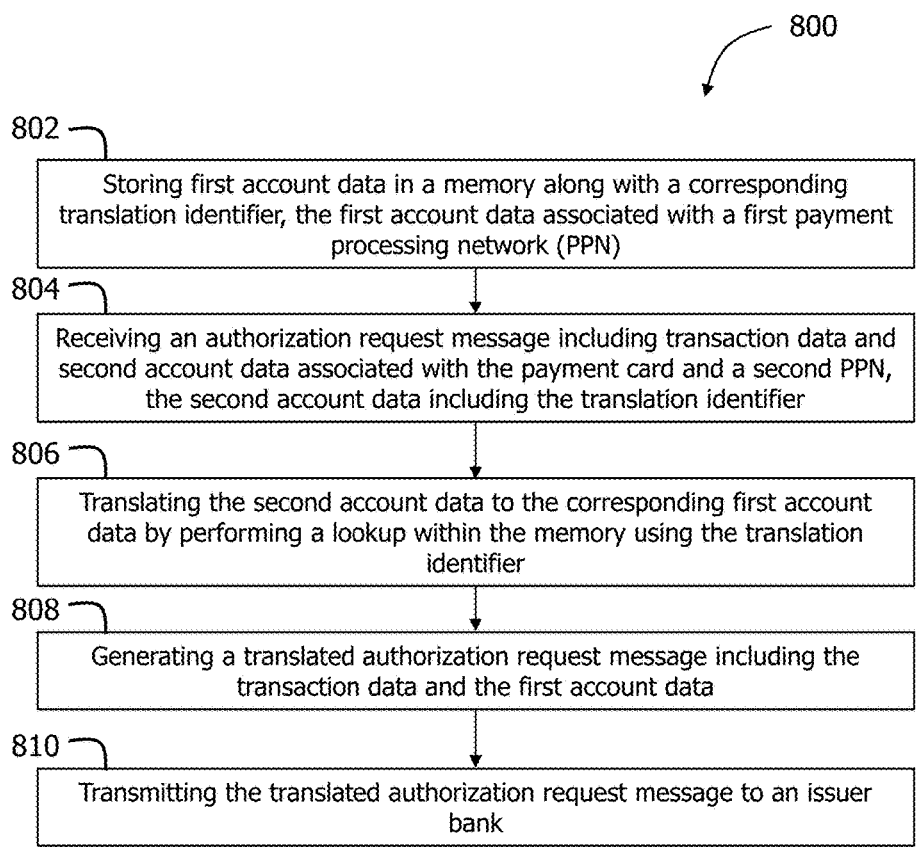

FIG. 8 is a flow diagram of a method 800 for translating account data during a transaction. Method 800 is implemented using a translation service (TS) computing device (e.g., TS computing device 121, shown in FIG. 2) in communication with a processor and a memory. Method 800 includes storing 802 first account data in the memory along with a corresponding translation identifier, the first account data associated with a first payment processing network (PPN). Method 800 also includes receiving 804, at the TS computing device, an authorization request message including transaction data associated with the transaction and second account data associated with the payment card and a second PPN, the second account data including the translation identifier. Method 800 further includes translating 806 the second account data to the associated first account data by performing a lookup within the memory using the translation identifier. Method 800 also includes generating 808 a translated authorization request message including the transaction data and the first account data and transmitting 810 the translated authorization request message to an issuer bank (e.g., issuer bank 30, shown in FIG. 1).

Figure 9:
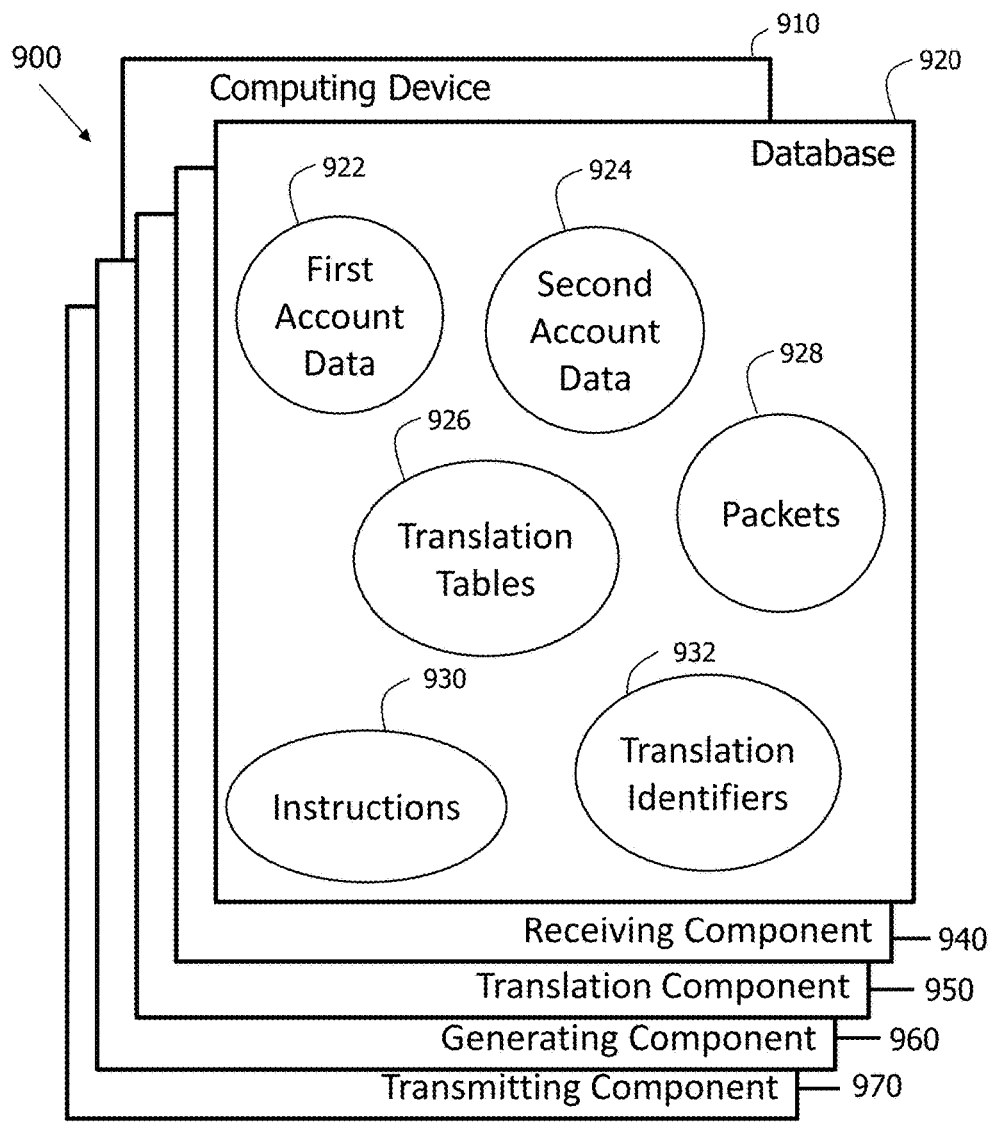

FIG. 9 is a diagram 900 of components of an example computing device 910 that may be used in account portfolio conversion (APC) system 102 shown in FIG. 2. In some embodiments, computing device 910 is similar to translation service (TS) computing device 121 (also shown in FIG. 2). A database 920 may be coupled with several separate components within computing device 910, which perform specific tasks. In the example embodiment, database 920 may store first account data 922, which represents at least a portion of original (unconverted or untranslated) data from a converted account portfolio originally associated with a first payment processing network (PPN). Database 920 may further store second account data 924, which represents at least a portion of translated or converted data from the converted account portfolio. Second account data 924 corresponds to first account data 922, as described herein. Database 920 may further store one or more translation or conversion tools, including translation tables 926, packets 928 of compiled first or second account data elements, and/or instructions 930 for implementing additional or alternative translation algorithms. Database 920 may further store translation identifiers 932, which may be associated with first account data 922, second account data 924, and/or one or more translation tools, such as a translation table 926.

In the example embodiment, computing device 910 includes a receiving component 940. Receiving component 940 may be configured to receive an authorization request message during a transaction initiated by a cardholder using a payment card. The authorization request message includes transaction data and second account data 924 associated with the payment card a second PPN. Second account data 924 includes a translation identifier 932 corresponding to first account data 922.

Computing device 910 further includes a translation component 950, which is configured translate second account data 924 to corresponding first account data 922 be performing a lookup within database 920 using translation identifier 932. As described herein, translation component 950 may access and/or implement translation tables 926, packets 928, and/or instructions 930, or any other suitable translation functionality, to translate second account data 924 to corresponding first account data 922. Additionally, in some embodiments, translation component 950 is further configured to translate first account data 922 to corresponding second account data 924, where necessary.

Computing device 910 further includes a generating component 960 configured to generate a translated authorization request message including the transaction data and first account data 922. Computing device 910 further includes a transmitting component 970 configured to transmit (e.g., wirelessly or over a wired connection) the translated authorization request message to an issuer bank for further processing of the transaction.

As will be appreciated based on the foregoing specification, the above-described embodiments of the disclosure may be implemented using computer programming or engineering techniques including computer software, firmware, hardware or any combination or subset thereof, wherein the technical effect is a flexible system for converting an account portfolio by translating account data. Any such resulting program, having computer-readable code means, may be embodied or provided within one or more computer-readable media, thereby making a computer program product, i.e., an article of manufacture, according to the discussed embodiments of the disclosure. The computer-readable media may be, for example, but is not limited to, a fixed (hard) drive, diskette, optical disk, magnetic tape, semiconductor memory such as read-only memory (ROM), and/or any transmitting/receiving medium such as the Internet or other communication network or link. The article of manufacture containing the computer code may be made and/or used by executing the code directly from one medium, by copying the code from one medium to another medium, or by transmitting the code over a network.

These computer programs (also known as programs, software, software applications, "apps", or code) include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The "machine-readable medium" and "computer-readable medium," however, do not include transitory signals. The term "machine-readable signal" refers to any signal used to provide machine instructions and/or data to a programmable processor.

This written description uses examples to disclose the disclosure, including the best mode, and also to enable any person skilled in the art to practice the disclosure, including making and using any devices or systems and performing any incorporated methods. The patentable scope of the disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A computer-implemented method for translating account data during a transaction initiated by a cardholder using a payment card, the method implemented using a translation service (TS) computing device in communication with a processor and a memory, the method comprising:
storing first account data in the memory along with a corresponding translation identifier, the first account data associated with a first payment processing network (PPN) that processes transactions initiated using the first account data;
receiving, by the TS computing device from a second PPN, an authorization request message including transaction data associated with the transaction initiated by the cardholder, the transaction data including second account data associated with the payment card and with the second PPN, which processes transactions initiated using the second account data, wherein the first PPN and the second PPN are different, the second account data including the translation identifier;

detecting, by the TS computing device, the translation identifier in the second account data;
translating, by the TS computing device, in response to said detecting, the second account data to the first account data by performing a lookup within the memory using the translation identifier;
generating, by the TS computing device, a translated authorization request message including the transaction data and the first account data; and
transmitting, by the TS computing device over the second PPN, the translated authorization request message to an issuer bank for use by the issuer bank for authorization of the transaction with the first account data and without processing by the first PPN.

2. The computer-implemented method of claim 1 further comprising:
receiving an authorization response message from the issuer bank including the transaction data and the first account data;
translating the first account data to the corresponding second account data using the translation identifier; and
generating a translated authorization response message including the transaction data and the second account data.

3. The computer-implemented method of claim 1, wherein the authorization request message includes a data string including a plurality of second account data elements, and wherein generating a translated authorization request message comprises:
replacing one or more of the second account data elements with a first data element of the first account data; and
electronically generating the translated authorization request message as a translated data string including the one or more replaced data elements.

4. The computer-implemented method of claim 1, wherein the first account data includes a plurality of first account data elements and the second account data includes a plurality of second account data elements, each of the plurality of second account data elements corresponding to an associated first account data element, said method further comprising:
detecting the translation identifier included within the plurality of second account data elements, wherein the translation identifier identifies the second account data as being associated with a converted account portfolio; and
performing a lookup of a translation table mapping the first account data to the second account data within the memory.

5. The computer-implemented method of claim 1, wherein the first account data includes a plurality of first account data elements and the second account data includes a plurality of second account data elements, each of the plurality of second account data elements corresponding to an associated first account data element, and wherein translating the second account data to the corresponding first account data comprises translating each of plurality of second account data elements to the associated first data element.

6. The computer-implemented method of claim 1, wherein the first account data includes a plurality of first account data elements and the second account data includes a plurality of second account data elements, each of the plurality of second account data elements corresponding to an associated first account data element, said method further comprising:

compiling a packet including the plurality of first account data elements;
storing the packet in the memory;
identifying one of the plurality of second account data elements corresponding to one of the first account data elements;
retrieving the stored packet; and
generating the translated authorization request message including the transaction data and the retrieved packet.

7. The computer-implemented method of claim 1 wherein the first account data includes a plurality of first account data elements and the second account data includes a plurality of second account data elements, each of the plurality of second account data elements corresponding to an associated first account data element, said method further comprising:
generating a translation table associating each second account data element with the associated first account data element; and
storing the translation table in the memory along with the translation identifier.

8. A translation service computing device comprising a processor in communication with a memory, said processor programmed to:
store first account data in the memory along with a corresponding translation identifier, the first account data associated with a first payment processing network (PPN) that processes transactions initiated using the first account data;
receive, from a second PPN, an authorization request message during a transaction initiated by a cardholder using a payment card, the authorization request message including transaction data associated with the transaction, the transaction data including second account data associated with the payment card and with the second PPN, which processes transactions initiated using the second account data, wherein the first PPN and the second PPN are different, the second account data including the translation identifier;
detect the translation identifier in the second account data;
translate, in response to detecting the translation identifier, the second account data to the first account data by performing a lookup within the memory using the translation identifier;
generate a translated authorization request message including the transaction data and the first account data; and
transmit, over the second PPN, the translated authorization request message to an issuer bank for use by the issuer bank for authorization of the transaction with the first account data and without processing by the first PPN.

9. The translation service computing device of claim 8, wherein said processor is further programmed to:
receive an authorization response message from the issuer bank including the transaction data and the first account data;
translate the first account data to the corresponding second account data using the translation identifier; and
generate a translated authorization response message including the transaction data and the second account data.

10. The translation service computing device of claim 8, wherein the authorization request message includes a data string including a plurality of second account data elements, and wherein said processor is further programmed to:

replace one or more of the second account data elements with a first data element of the first account data; and
electronically generate the translated authorization request message as a translated data string including the one or more replaced data elements.

11. The translation service computing device of claim 10, wherein the first account data includes a plurality of first account data elements and the second account data includes a plurality of second account data elements, each of the plurality of second account data elements corresponding to an associated first account data element, and wherein said processor is further programmed to:
   detect the translation identifier included within the plurality of second account data elements, wherein the translation identifier identifies the second account data as being associated with a converted account portfolio; and
   perform a lookup of a translation table mapping the first account data to the second account data within the memory.

12. The translation service computing device of claim 8, wherein the first account data includes a plurality of first account data elements and the second account data includes a plurality of second account data elements, each of the plurality of second account data elements corresponding to an associated first account data element, and wherein said processor is further programmed to translate each of plurality of second account data elements to the associated first data element.

13. The translation service computing device of claim 8, wherein the first account data includes a plurality of first account data elements and the second account data includes a plurality of second account data elements, each of the plurality of second account data elements corresponding to an associated first account data element, and wherein said processor is further programmed to:
   compile a packet including the plurality of first account data elements;
   store the packet in the memory;
   identify one of the plurality of second account data elements corresponding to one of the first account data elements;
   retrieve the stored packet; and
   generate the translated authorization request message including the transaction data and the retrieved packet.

14. The translation service computing device of claim 8, wherein the first account data includes a plurality of first account data elements and the second account data includes a plurality of second account data elements, each of the plurality of second account data elements corresponding to an associated first account data element, and wherein said processor is further programmed to:
   generate a translation table associating each second account data element with the associated first account data element; and
   store the translation table in the memory along with the translation identifier.

15. At least one non-transitory computer-readable media having computer-executable instructions embodied thereon, wherein when executed by at least one processor, the computer-executable instructions cause the at least one processor to:
   store first account data in a memory along with a corresponding translation identifier, the first account data associated with a first payment processing network (PPN) that processes transactions initiated using the first account data;
   receive, from a second PPN, an authorization request message during a transaction initiated by a cardholder using a payment card, the authorization request message including transaction data associated with the transaction, the transaction data including second account data associated with the payment card and with the second PPN, which processes transactions initiated using the second account data, wherein the first PPN and the second PPN are different, the second account data including the translation identifier;
   detect the translation identifier in the second account data;
   translate, in response to detecting the translation identifier, the second account data to the first account data by performing a lookup within the memory using the translation identifier;
   generate a translated authorization request message including the transaction data and the first account data; and
   transmit, over the second PPN, the translated authorization request message to an issuer bank for use by the issuer bank for authorization of the transaction with the first account data and without processing by the first PPN.

16. The non-transitory computer-readable media of claim 15, wherein the computer-executable instructions further cause the at least one processor to:
   receive an authorization response message from the issuer bank including the transaction data and the first account data;
   translate the first account data to the corresponding second account data using the translation identifier; and
   generate a translated authorization response message including the transaction data and the second account data.

17. The non-transitory computer-readable media of claim 15, wherein the authorization request message includes a data string including a plurality of second account data elements, and wherein the computer-executable instructions further cause the at least one processor to:
   replace one or more of the second account data elements with a first data element of the first account data; and
   electronically generate the translated authorization request message as a translated data string including the one or more replaced data elements.

18. The non-transitory computer-readable media of claim 15, wherein the first account data includes a plurality of first account data elements and the second account data includes a plurality of second account data elements, each of the plurality of second account data elements corresponding to an associated first account data element, and wherein the computer-executable instructions further cause the at least one processor to:
   detect the translation identifier included within the plurality of second account data elements, wherein the translation identifier identifies the second account data as being associated with a converted account portfolio; and
   perform a lookup of a translation table mapping the first account data to the second account data within the memory.

19. The non-transitory computer-readable media of claim 15, wherein the first account data includes a plurality of first account data elements and the second account data includes a plurality of second account data elements, each of the plurality of second account data elements corresponding to an associated first account data element, and wherein the computer-executable instructions further cause the at least one processor to:
   compile a packet including the plurality of first account data elements;
   store the packet in the memory;
   identify one of the plurality of second account data elements corresponding to one of the first account data elements;
   retrieve the stored packet; and
   generate the translated authorization request message including the transaction data and the retrieved packet.

20. The non-transitory computer-readable media of claim 15, wherein the first account data includes a plurality of first account data elements and the second account data includes a plurality of second account data elements, each of the plurality of second account data elements corresponding to an associated first account data element, and wherein the computer-executable instructions further cause the at least one processor to:
   generate a translation table associating each second account data element with the associated first account data element; and
   store the translation table in the memory along with the translation identifier.

* * * * *